United States Patent
Schnitter et al.

(10) Patent No.: US 8,187,567 B2
(45) Date of Patent: May 29, 2012

(54) INORGANIC COMPOUNDS

(75) Inventors: Christoph Schnitter, Holle (DE); Holger Brumm, Goslar (DE); Christine Rawohl, Goslar (DE); Colin McCracken, Sinking Springs, PA (US)

(73) Assignee: H. C. Starck GmbH (DE)

( * ) Notice: Subject to any disclaimer, the term of this patent is extended or adjusted under 35 U.S.C. 154(b) by 37 days.

(21) Appl. No.: 11/916,125

(22) PCT Filed: May 31, 2006

(86) PCT No.: PCT/EP2006/005184
§ 371 (c)(1),
(2), (4) Date: Feb. 18, 2008

(87) PCT Pub. No.: WO2006/128687
PCT Pub. Date: Dec. 7, 2006

(65) Prior Publication Data
US 2008/0199393 A1    Aug. 21, 2008

(30) Foreign Application Priority Data

Jun. 3, 2005  (GB) .................................. 0511321.2
Feb. 6, 2006  (GB) .................................. 0602330.3

(51) Int. Cl.
*C01G 31/02* (2006.01)
(52) U.S. Cl. .................. 423/594.17; 423/265; 428/662; 428/702; 361/508; 361/523; 361/528; 361/529; 29/25.03; 419/19

(58) Field of Classification Search ............. 423/594.17, 423/265; 361/508, 523, 528, 529; 428/702, 428/662; 29/25.03; 419/19
See application file for complete search history.

(56) References Cited

U.S. PATENT DOCUMENTS

| | | | |
|---|---|---|---|
| 6,762,927 B2 * | 7/2004 | Schnitter et al. | 361/508 |
| 2002/0134196 A1 * | 9/2002 | Naito | 75/245 |
| 2003/0104923 A1 * | 6/2003 | Omori et al. | 501/134 |
| 2005/0013765 A1 | 1/2005 | Thomas et al. | |

FOREIGN PATENT DOCUMENTS

| | | |
|---|---|---|
| EP | 0 953 847 A1 | 11/1999 |
| EP | 1 388 870 A1 | 2/2004 |
| EP | 1 498 39 A1 | 1/2005 |

OTHER PUBLICATIONS

ASTM B822, 1997, pp. 1-3.
ASTM B213, 2003, pp. 1-3.
ASTM D3663, 2003, pp. 1-5.
ASTM B329, 2006, pp. 1-3.

* cited by examiner

*Primary Examiner* — Jerry Lorengo
*Assistant Examiner* — Pritesh Darji
(74) *Attorney, Agent, or Firm* — Connolly Bove Lodge & Hutz LLP (57) ABSTRACT

Disclosed is a niobium suboxide powder for the manufacture of capacitors with higher break down voltages, higher temperatures of operation and elongated lifetimes. The powder is doped with nitrogen which is at least partly present in the form homogeneously distributed, x-ray detectable $Nb_2N$-crystal domains. The niobium suboxide powder contains niobium suboxide particles having a bulk nitrogen content of between 500 to 20,000 ppm.

12 Claims, 5 Drawing Sheets

INORGANIC COMPOUNDS

CROSS-REFERENCE TO RELATED APPLICATIONS

Related Applications

This application is a national stage application (under 35 U.S.C. 371) of PCT/EP2006/005184 filed May 31, 2006, which claims benefit of United Kingdom application 0511321.2 filed Jun. 3, 2005 and United Kingdom application 0602330.3 filed Feb. 6, 2006.

BACKGROUND OF THE INVENTION

Solid electrolyte capacitors useful in mobile communication devices generally comprise an electrically conductive carrier of high specific surface, covered by a non-conductive niobium or tantalum pentoxide layer taking advantage from the high stability and high dielectric constant of the valve metal oxide, wherein the isolating pentoxide layer can be generated by electrolytic oxidation at very constant thickness. The valve metal or conductive lower oxides (suboxides, $NbO_x$) of the valve metals are used as the carrier material. The carrier, which forms one of the electrodes (anode) of the capacitor generally has a highly porous sponge-like structure which is generated by sintering of very fine primary structures or sponge-like secondary structures. The surface of the conductive carrier structure is electrolytically oxidized ("forming"), whereby the thickness of the isolating pentoxide layer is determined by the maximum voltage of the electrolytic oxidation ("forming voltage"). The counter electrode is generated by soaking of the sponge-like surface-oxidized structure with manganese nitrate, which is thermally transformed into manganese dioxide, or, by soaking of a liquid precursor of a polymer electrolyte (e.g. PEDT, polypyrole) and polymerisation thereof. Electrical terminals are a tantalum or niobium wire sintered with the sponge-like structure at the anode side and the metallic housing of the capacitor, which is isolated against the wire at the cathode side.

The capacitance C of the capacitor is calculated according to the formula $$C = (F \cdot \in)/(d \cdot V_F),$$

wherein F is the active surface of the capacitor, $\in$ is the dielectric constant of the pentoxide layer, d is the thickness of the isolating pentoxide layer per Volt forming voltage, and $V_F$ is the forming voltage. The ratio $\in/d$ is nearly equal for tantalum pentoxide and niobium pentoxide (1.64 resp. 1.69), although $\in$ (27.6 resp. 41) and d (16.6 resp. 25 A/V) differ appreciably. Accordingly, capacitors on basis of both the pentoxides having the same geometrical structure have the same capacitance. Specific capacitances per weight differ due to the different densities of Nb, $NbO_x$ and Ta respectively. Carrier (anode) structures of Nb or $NbO_x$, accordingly, do have the advantage of saving weight, when used in mobile phones, where reduction of weight is one of the objects. Regarding costs, $NbO_x$ is more feasible than Nb, providing part of the volume of the anode structure from oxygen.

An important quality criterion is life time of the capacitor, which depends from the voltage of operation thereof and decreases with increasing voltage. For opening up a wider range of applications, it would be desirable to increase the lifetime, particularly in the upper voltage of operation level.

Furthermore it would be desirable to allow for an increase of the temperature of operation. Presently, the temperature of operation of capacitors based on NbO is limited to about 125° C. A higher allowable temperature of operation would open up the use of capacitors on basis of NbO in the automotive industry.

Furthermore, with reference to safety aspects, it would be desirable to increase the breakdown voltage, and to slow down the burning rate, and to reduce the generation of heat during burning after ignition, of the powders, the sintered anode structures and of the capacitors.

BRIEF SUMMARY OF THE INVENTION

One object of the invention is to provide a niobium suboxide powder of improved properties from which capacitors of increased service life time may be produced.

Another object of the invention is to provide a niobium suboxide powder of improved properties allowing for higher temperature of operation of capacitors made there from.

Another object of the invention is to provide a niobium suboxide powder of improved properties allowing for the production of capacitors of increased breakdown voltage.

Another object of the invention to provide a niobium suboxide powder, and an anode structure made there from, with reduced burning rate and reduced generation of heat, when ignited.

These and other objects are achieved with the present invention.

DETAILED DESCRIPTION OF THE INVENTION

Subject of the present invention is a niobium suboxide powder comprising niobium suboxide particles having a bulk nitrogen content of between 500 to 20,000 ppm, preferably 1000 to 10,000 ppm. More preferred is a nitrogen content between 2000 and 8000 ppm, particularly preferred 3000 to 5000 ppm.

DETAILED DESCRIPTION OF THE INVENTION

Preferably the nitrogen is present in the niobium suboxide powder according to the invention at least partly in the form of $Nb_2N$ crystals or niobium oxynitride. $NbO_xN_y$ crystals.

It is well known in the technology of tantalum capacitors that surface nitrogen has a positive effect on sintering of tantalum powder, also improving leakage current of tantalum capacitors. Contrary to this, an important aspect of the present invention is that the nitrogen is quasi homogeneously distributed in the bulk of the powder particles preferably at least partly in the form of very small $Nb_2N$ crystal domains, in an amount and size sufficiently large that a peak at a 2Θ-angle of about 38.5° (101-reflex of $Nb_2N$) can be detected when investigated by x-ray diffraction method using $Cu_{K\alpha}$-radiation.

Preferably, the height of the $Nb_2N$ peak at about 2Θ=38.5° is less than 25% of the height of the NbO peak at 2Θ=30° (110-reflex of NbO), particularly less than 15% of the height of the NbO peak at 2Θ=30°.

Furthermore preferred powders show an $Cu_{K\alpha}$-x-ray peak at 2Θ=38.5°, the height of which is at least 2%, preferably at least 5%, of the height of the NbO-peak at 2Θ=30°. In the higher range of nitrogen content additional crystalline nitride phases such as niobium nitride or niobium oxynitride may be detectable. More specifically, $Nb_4N_3$, $NbN_{0.77}$, $Nb_{0.77}N_{0.091}$, $NbN_{0.64}$, $NbN_{0.9}$, $NbN_{0.95}$, $Nb_{4.62}N_{2.14}$, $Nb_4N_{3.92}$, $Nb_4N_5$, $Nb_5N_6$, $NbN_{0.801}$, NbN etc or mixtures thereof, or niobium oxynitrides, like $NbN_{0.6}O_{0.3}$, $NbN_{0.6}O_{0.2}$, $NbN_{0.9}O_{0.1}$, Nb(N,O) etc, or mixtures thereof with each other or niobium nitrides, may be detectable. In particular, $NbN_{0.77}$, $NbN_{0.95}$, NbN etc, or niobium oxynitride, may be detectable.

The half-value width of the $Cu_{K\alpha 1}$-peak at about $2\Theta=38.5°$ ((101)-peak of $Nb_2N$) preferably is between 0.05° and 0.2°, preferably 0.07 and 0.15°, as determined with an goniometer type Panalytical X 'Pert MPD PW 3050, anode Cu at 50 kV and 40 mA, having a divergence slit and anti scatter slit of ½°2Θ each, a receiving slit of 0.2 mm, soller slits of 0.04 rad, a beam mask of 20 mm, the detector being proportional Xe filled. The scanning program is step size 0.01°2Θ with scan speed of 0,001°2Θ/sec between 37,7 and 39,5°2Θ of 0.001°2Θ/sec between 37.7 and 39.5°2Θ. The $Cu_{K\alpha 2}$ reflex is striped.

Preferably the powder according to the present invention has a grain size distribution characterized by a D10-value of between 50 and 90 µm, a D50-value of between 150 and 210 µm, and a D90-value of between 250 to 350 µm, as determined according to ASTM B 822 ("Mastersizer", wetting agent Daxad 11). Particularly preferred are powders having spherical or elliptical grains providing for good flowability of less than 80 sec/25 g, preferably 60 sec/25 g, particularly preferred 40 sec/25 g, as determined according to ASTM B 213 ("Hall flow"). The bulk density of the powders according to the invention preferably is between 0.5 and 2 g/cm³, preferably 0.9 and 1.2 g/cm³ (14.8 to 19.7 g/inch³), as determined according to ASTM B 329 ("Scott density").

The individual grains or particles of the niobium suboxide powder preferably are highly porous agglomerates of dense primary particles of mean size having a smallest cross sectional diameter of 0.1 to 1.5 µm, preferably 0.3 to 1.0 µm. The primary particles may have spherical, chip-like or fibrous structure. Preferably the smallest cross sectional diameter of the primary particles is between 0.4 and 1 µm.

The porosity of anodes sintered from the powder according to the invention, as determined by mercury intrusion, preferably is between 50 and 70% by volume, particularly preferred between 53 and 65% by volume. More than 90% of the pore volume consists of pores having a diameter of 0.2 to 2 µm. The broad pore distribution curve has steep flanks at both sides with a minimum in the range of twice the primary particle diameter.

The specific surface area of the powders according to the invention preferably is between 0.5 and 12.0 m²/g, preferably 0.6 to 6 m²/g, more preferably 0.7 to 2.5 m²/g, as determined according to ASTM D 3663 ("BET-surface"), particularly preferred is a specific surface of between 0.8 and 1.2 m²/g or of between 0.8 and 1.3 m²/g.

Capacitors made from the powder according to the invention may have a specific capacity of between 40,000 to 300,000 µFV/g, commonly between 60,000 and 200,000 µFV/g.

Preferred niobium oxide powders according to the invention have a composition according to the formula $NbO_x$ with 0.7<x<1.3, corresponding to an oxygen content of between 10.8 and 18.3% by weight, particularly preferred is 1.0<x<1.033, or powders having an oxygen content of between 14.5 to 15.1% by weight.

Generally, impurities in the niobium suboxide powders according to the invention should be as low as possible, particularly harmful impurities in capacitor application such as Fe, Cr, Ni, Cu, Na, K, and Cl, are less than 15 ppm each. Preferably the sum of those harmful impurities is less than 35 ppm. The carbon content preferably is less than 40 ppm. Other less harmful impurities such as Al, B, Ca, Mn, and Ti are preferably present in an amount of less than 10 ppm, Si less than 20 ppm. Mg may present in an amount of up to 500 ppm.

Phosphorous generally is not harmful. In niobium metal and tantalum metal powders for capacitors, phosphorous doping is used for reducing the sintering activity of the powders. A reduction of sintering activity of the niobium suboxide powders according to the invention is normally not desirable. Preferably the phosphorous content accordingly is below 10 ppm. If necessary the substantially phosphorous free powders may treated with phosphorous acid, ammonium hydrogen phosphate or ammonium phosphate solution prior to sintering.

Tantalum may be present as an alloying component substituting niobium according to formula $(Nb,Ta)O_x$.

Subject of the invention also is a process for the manufacture of nitrogen containing niobium suboxide powder, which process starts from a niobium metal powder precursor and is characterized in that the niobium metal precursor is nitrided before transformation to niobium oxide.

Various methods are known for the transformation of niobium metal powder into NbO. The preferred method according to the invention is the solid state disproportionation method: The niobium metal powder is mixed with a stoichiometric amount of niobium oxide, which is oxidized higher than the desired product, preferably $Nb_2O_5$ or $NbO_2$, and thereafter the mixture is heated to a temperature sufficient to initiate disproportionation, generally to a temperature between 800 and 1600° C. in a non-oxidizing atmosphere, preferably a reducing inert gas atmosphere such as hydrogen or argon/hydrogen mixtures, for a time sufficient to give a homogeneous oxygen distribution, e.g. for several hours. Preferably, the metal precursor as well as the oxide precursor consists of primary particles of about 1 µm diameter or less (smallest cross section, if non-spherical).

For the nitridation of the niobium metal precursor powder (doping of the metal with nitrogen) the metal powder is mixed with a solid nitrogen containing compound, such as $Mg(N_3)_2$ or $NH_4Cl$, or treated with an aqueous solution thereof, and heated to a temperature of 400 to 750° C. in an inert atmosphere, or reacted with a gaseous nitrogen containing reactant, such as $N_2$ or $NH_3$ at a temperature of 400 to 750° C. Preferably the gaseous reactant is supplied in an inert gas atmosphere, such as argon, at a ratio of 15 to 30%. The amount of nitrogen doping is controlled by properly selecting time and temperature of the heat treatment.

According to another method, nanocrystalline niobium nitride may be mixed at the required ratio with niobium metal powder and heat treated at between 400 and 900° C. in an inert gas atmosphere for nitridation of the metal powder.

The niobium metal powder precursor and the higher oxidized oxide precursor may be mixed prior to the nitridation, which allows for reduction of handling. In this case, after completion of the nitridation, the atmosphere is exchanged and the mixture is further heated to the temperature where the solid state disproportionation occurs.

Extremely pure $Nb_2O_5$, which may be used as the oxide precursor of the invention, is available from precipitation of niobium hydroxide from an aqueous $H_2NbF_7$ solution by addition of an aqueous $NH_4OH$ solution and calcinations of the niobium hydroxide separated from the solution.

The niobium metal precursor preferably is obtained from extremely pure $Nb_2O_5$ by reduction. This may occurs by aluminothermic reduction, i.e. igniting a $Nb_2O_5/Al$ mixture, washing out the aluminium oxide there from and purification of the niobium metal by electron beam heating. The niobium metal ingot obtained thereby may be made brittle by diffusion of hydrogen in a known manner and milled to give a powder having chip like particle shape.

The preferred process to reduce the pentoxide to metal is the two-stage process disclosed in WO 00/67936. According to this process the pentoxide is first reduced to approximately niobium dioxide in hydrogen atmosphere at about 1000 to 1600° C. and in the second stage to niobium metal with magnesium vapour at about 900 to 1100° C. Magnesium oxide, which is formed during reduction, may be removed by washing with acid. However it is not necessary to remove the magnesium oxide prior to nitridation and transformation of the niobium metal to $NbO_x$. In the contrary, the presence of magnesium oxide during the transformation to $NbO_x$ has a positive influence on the porosity of the $NbO_x$-powder.

The grain size (secondary particle size) of the powder particles may be adjusted by properly selecting the temperature at which the solid state disproportionation is carried out or later by a sintering heat treatment of the product in an argon atmosphere preferably containing up to 10% of hydrogen, and screening.

The invention is now explained in more detail by way of the following examples:

A Precursors: The following precursors were used:

A1: High purity $Nb_2O_5$ obtained by precipitation from an aqueous $H_2NbO_7$ solution by addition of an aqueous $NH_4OH$ solution, separation of the precipitate, drying and calcination in air at 1100° C., with the following analytical data:

| | |
|---|---|
| Al: | 1 ppm |
| Cr: | <0.3 ppm |
| C: | <10 pp |
| Fe: | <0.5 ppm |
| K: | 0.6 ppm |
| Mg: | <1 ppm |
| Mn: | <0.1 ppm |
| Mo: | <0.3 ppm |
| Na: | 3 ppm |
| Ni: | <0.2 ppm |
| Si: | 14 ppm |
| Scott density: | 12.2 g/inch$^3$. |

A2: $NbO_2$ obtained from reduction of precursor A1 ($Nb_2O_5$) in a molybdenum crucible in hydrogen at 1450° C. with the following analytical data:

| | |
|---|---|
| Al: | 2 ppm |
| Cr: | <2 ppm |
| C | 12 ppm |
| Fe: | <2 ppm |
| K: | 1 ppm |
| Mo: | 54 ppm |
| Na: | 4 ppm |
| Ni: | <2 ppm |
| N: | <300 ppm |
| O: | 26.79% |
| Si: | 14 ppm |
| BET: | 0.17 m$^2$/g |
| Scott density: | 23.6 g/inch$^3$ |

A3: Niobium metal: The precursor A2 ($NbO_2$) is placed within a reactor on a sieve made from niobium wire. Below the sieve is a crucible containing 1.05 times the stoichiometric amount magnesium with reference to the oxygen content of the $NbO_2$. Argon is continuously introduced at the bottom of the reactor and removed from the reactor on top. Then the reactor is heated to about 950° C. After consumption of the magnesium the reactor is cooled down to about 150° C. and air is slowly introduced into the reactor to passivate the niobium metal surface with the following analytical data:

| | |
|---|---|
| Al: | 2 ppm |
| Cr: | <2 ppm |
| C | <10 ppm |
| Fe: | <2 ppm |
| K: | 1 ppm |
| Mg: | 28.14% |
| Mo: | 41 ppm |
| Na: | 2 ppm |
| Ni: | <2 ppm |
| N: | <300 ppm |
| O: | 18.74% |
| Si: | 7 ppm |

A4: Niobium metal obtained by washing precursor A3 (magnesium oxide containing niobium metal) with sulphuric acid and rinsed with water until neutral. The analytical data are as follows:

| | |
|---|---|
| Al: | 3 ppm |
| Cr: | <2 ppm |
| C | <10 ppm |
| Fe: | <2 ppm |
| K: | 1 ppm |
| H: | 344 ppm |
| Mg: | 750 ppm |
| Mo: | 75 ppm |
| Na: | 3 ppm |
| Ni: | <2 ppm |
| N: | <300 ppm |
| O: | 1.65% |
| Si: | 8 ppm |
| BET: | 4.52 m$^2$/g |

If "<" is presented in the analytical data, the respective content is below the analytical limit and the figure behind represents the analytical limit.

Powder Production Examples

Example 1

Comparison 53.98 weight-% of precursor A4 (Nb) and 46.02 weight-% of precursor A1 ($Nb_2O_5$) are homogeneously mixed and heated in a hydrogen atmosphere to 1400° C. The product properties are shown in table 1.

Example 2

Precursor A4 (Nb) is homogeneously mixed with 1.5 times the stoichiometric amount of magnesium (with reference to the oxygen content) and 5.4 parts by weight of $NH_4Cl$ (per 100 parts Nb) and placed in reactor. The reactor is then rinsed with argon and heated to 700° C. for 90 minutes. After cooling down the reactor is slowly filled with air for passivation. After washing with sulphuric acid and rinsing a nitrogen doped niobium metal has been obtained, containing between 9600 and 10500 ppm nitrogen (average 9871 ppm). The oxygen content is 6724 ppm.

Figure 1:
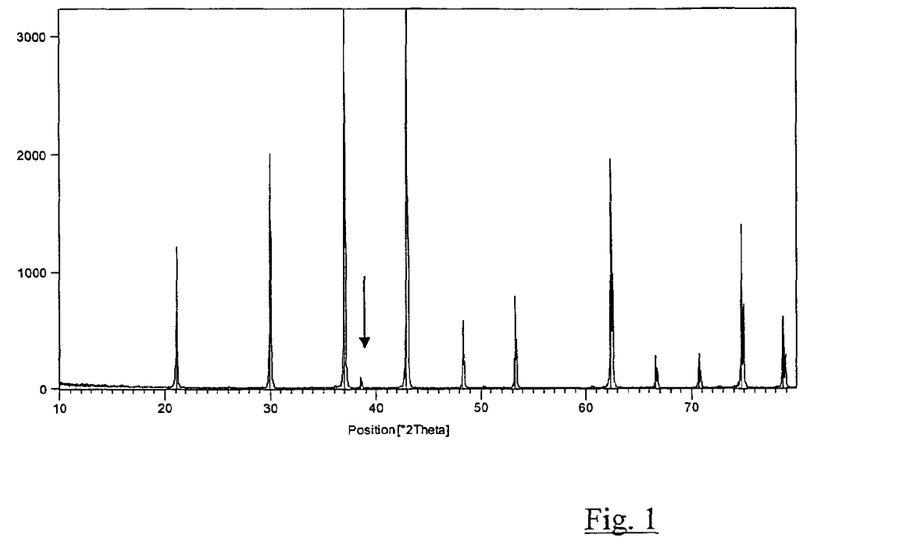
FIG. 1 is an x-ray diffraction pattern of a powder in accordance with an embodiment of the invention.

The nitrogen doped niobium is transformed to NbO in the same manner as in example 1. The product properties are shown in table 1. The x-ray diffraction pattern of the powder is shown in FIG. 1. Clearly, the $Nb_2N$ (101)-peak at $2\Theta=38.5°$ indicated by the arrow can be recognized. Accordingly, at least part of the N-doping is present in the form of a crystalline $Nb_2N$ phase.

Example 3

Example 2 was repeated with the deviation that the addition of $NH_4Cl$ was increased to 8.2 parts by weight. The niobium powder has an average nitrogen content of 14730 ppm. The oxygen content is 6538 ppm. The suboxide product properties are shown in table 1.

Example 4

Figure 2:
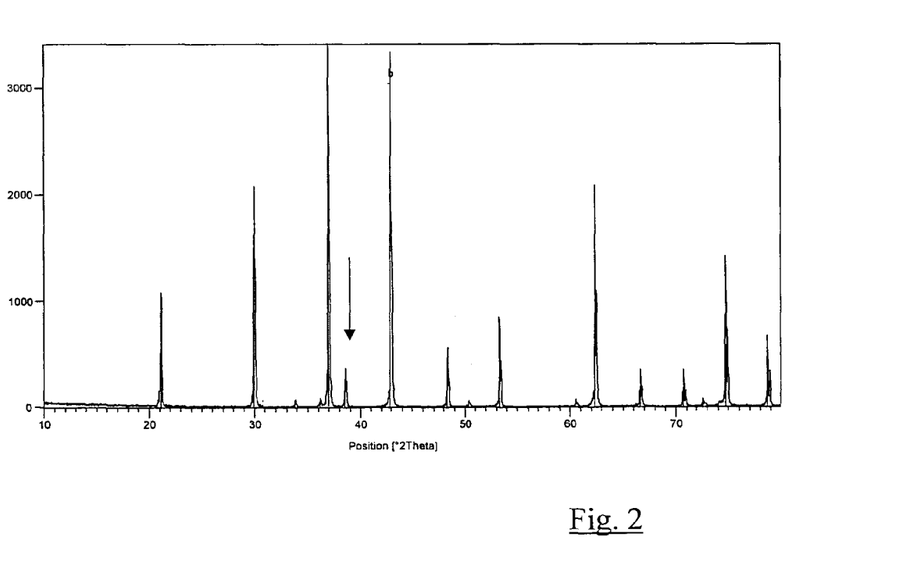
FIG. 2 is an x-ray diffraction pattern of a powder in accordance with another embodiment of the invention.

53.95 parts by weight of precursor A4 (Nb) and 46.05 parts by weight of precursor A1 ($Nb_2O_5$) are mixed homogeneously and placed in a reactor. The reactor was rinsed with argon and heated to 500° C. Thereafter the reactor was three times with an 80% Ar/20% N-mixture for 30 minutes each time. Thereafter powder mixture is heated to 1450° C. in hydrogen atmosphere. The product properties are shown in table 1. The x-ray diffraction pattern of the powder is shown in FIG. 2. Clearly, the $Nb_2N$-(101)-peak indicated by the arrow at $2\Theta=38.5°$ can be recognized.

Example 5

Precursor A3 (MgO containing Nb) is nitrided with nitrogen gas at 630° C. and thereafter magnesium oxide and residual magnesium metal removed by washing with 15% sulphuric acid. The oxygen content of the resulting niobium metal is 1.6% b.w.; the nitrogen content is 8515 ppm.

Figure 3:
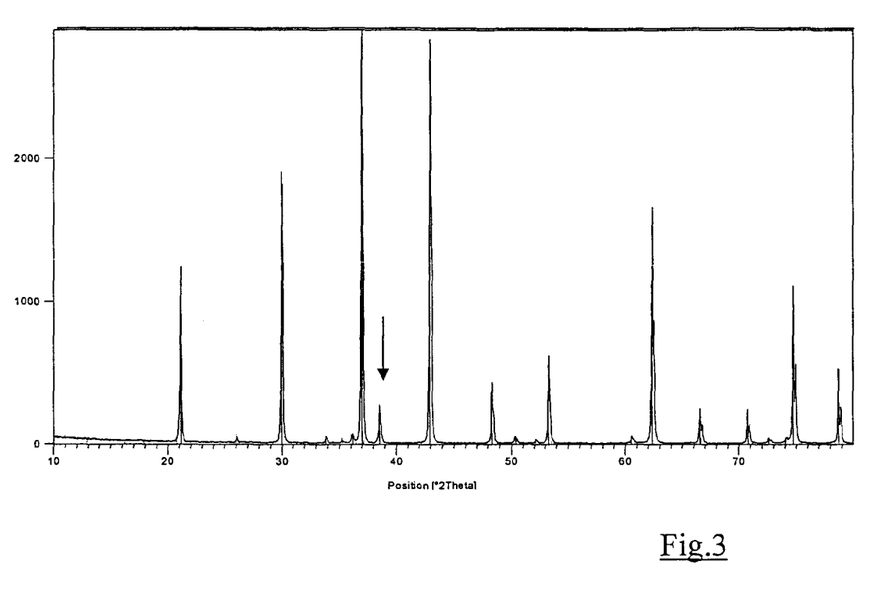
FIG. 3 is an x-ray diffraction pattern of a powder in accordance with another embodiment of the invention.

56.03 parts by weight of the N-doped niobium metal and 43.97 parts by weight of precursor A1 ($Nb_2O_5$) are mixed homogeneously and heated to 1100° C. in a hydrogen atmosphere. The product properties are shown in table 1. The x-ray diffraction pattern of the powder is shown in FIG. 3. Clearly, the $Nb_2N$-(101)-peak at $2\Theta=38.5°$ can be recognized.

TABLE 1

Properties of $NbO_x$ powders

| Example No. | BET $m^2/g$ | Mastersizer D10 μm | Mastersizer D50 μm | Mastersizer D90 μm | Scott density g/inch$^3$ | Hall flow sec | Analysis O % b.w. | Analysis N ppm |
|---|---|---|---|---|---|---|---|---|
| 1 (comp) | 1.02 | 60.52 | 190.63 | 295.4 | 15.8 | 48 | 14.97 | <300 |
| 2 | 1.04 | 62.06 | 170.67 | 290.05 | 17.2 | 43 | 14.9 | 5848 |
| 3 | 1.03 | 59.73 | 185.54 | 270.76 | 16.7 | 54 | 14.93 | 8115 |
| 4 | 1.0 | 58.73 | 191.04 | 299.93 | 14.7 | 45 | 14.98 | 6281 |
| 5 | 2.31 | 52.76 | 150.46 | 268.37 | 15.2 | 61 | 14.94 | 5062 |

Example 6

Precursor A2 ($NbO_2$) is placed within a reactor on a sieve made from niobium wire. Below the sieve is a crucible containing 1.05 times the stoichiometric amount magnesium with reference to the oxygen content of the $NbO_2$. Argon is continuously introduced at the bottom of the reactor and removed from the reactor on top. Then the reactor is heated to about 950° C. After consumption of the magnesium the reactor is cooled down to 575° C. and nitrogen is introduced for 3 hours. After cooling down, passivation and removal of magnesium oxide and residual magnesium metal a nitrogen doped niobium metal is obtained, which can be used for transformation to NbO.

Investigation of the Burning Rate:

50 g of each powders of examples 1 (comparison), 2 an 3 were arranged on a niobium sheet of 0.1 mm thickness in an array of 150×30 mm. The powder arrays were ignited at one end and the time for complete burning was measured (in air):

| | |
|---|---|
| powder of example 1 (comparison): | burning time 3 min 35 sec, |
| powder of example 2: | burning time 6 min 25 sec, |
| powder of example 3: | burning time 8 min 10 sec. |

Figure 4:
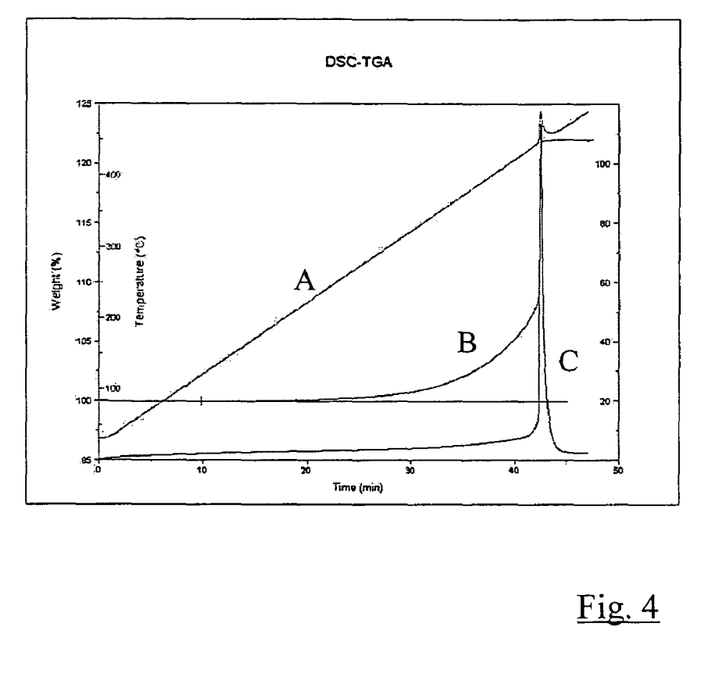
FIG. 4 is a DSC/TGA of a powder in accordance with an embodiment of the invention.
Figure 5:
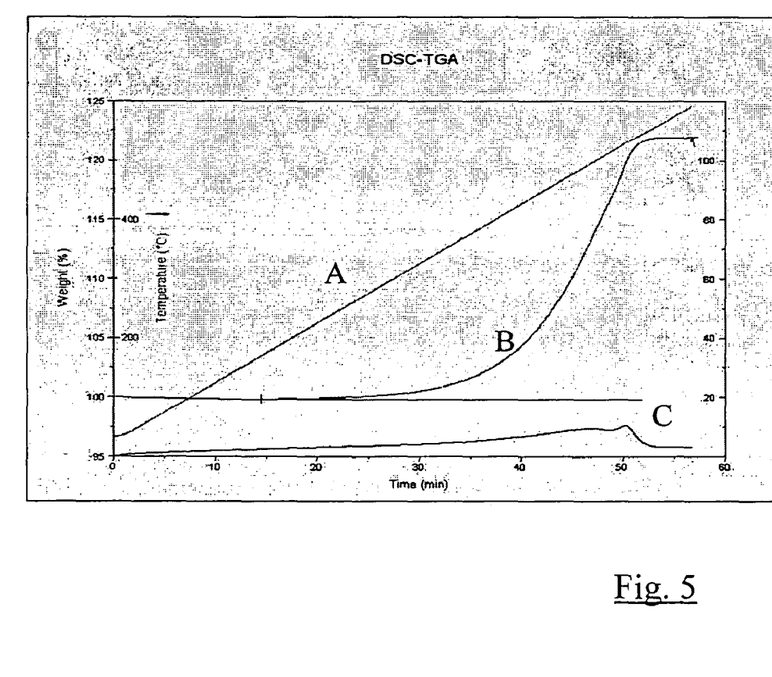
FIG. 5 is a DSC/TGA of a powder in accordance with another embodiment of the invention.

DSC/TGA Investigation:

A sample of example 1 and a sample of example 2 were heated in air from 25 to 600° C. and the increase of weight measured by thermo gravimetry (TGA). Simultaneously the heat flow accompanied therewith was measured by the DSC method. FIG. 4 shows respective curves for the powder of example 1 (comparison) and FIG. 5 shows the respective curves for the powder of example 2. In those Figs. curve A indicates the temperature (left inner scale from 0 to 600° C.), curve B indicates weight-% (left outer scale from 95 to 125%), and curve C indicates the heat flow with correction for weight (right scale from 0 to 120 W/g) over time (horizontal scale from 0 to 50 resp. 60 sec.), each. Both samples show a slight increase in weight above about 200° C. with small heat development. Until about 450° C. weight increase and exothermic heat is very similar for both samples. Above about 450° C. the nitrogen free sample suffers a sudden increase in weight and corresponding strong development of heat (FIG. 5), whereas for the nitrogen containing sample heat development and weight increase rate remain moderate also above 450° C. with no exothermic peak.

Preparation of Anodes

The $NbO_x$ powder of example 1 (comparison) and example 2 respectively are filled into cylindrical press moulds of 4.1 mm diameter and 4.2 mm length around an axially arranged tantalum wire. The powder is pressed to green bodies having a density of 2.8 g/cm³. The green bodies were placed on a niobium tablet and heated to 1460° C. in a vacuum of $10^{-8}$ bars for a holding time of 20 minutes.

Investigation of the Break Down Voltage of Anodes

The anodes are immersed into an aqueous 0.1% phosphoric acid solution (conductivity 8600 µS/cm) at a temperature of 85° C. and a constant current of 150 mA is applied for forming until voltage suddenly drops down (break down voltage). The anodes made from powder of example 1 (comparison) gave a sudden voltage drop at 96 V, whereas the anodes made from powder of example 2 gave a sudden voltage drop at 104 V.

Investigation of Capacitors

Figure 6:
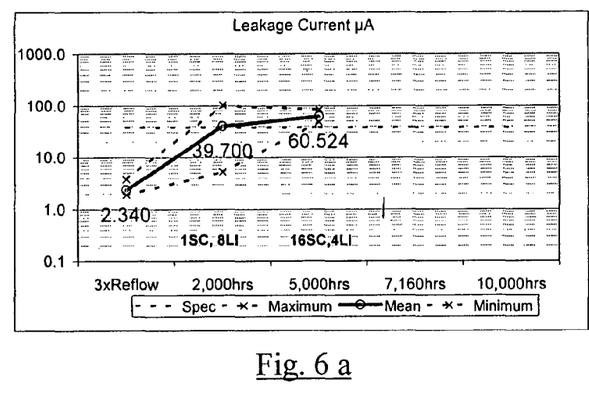
FIGS. 6a and 6b show the leakage current respectively the capacitance of a capacitor made from the powder of example 1 (comparison) at a temperature of 125° C. and a working voltage of 4 V during 5000 hours of operation.

In an industrial production line capacitors were produced from the powder of example 1 (comparison) as well as from powders of example 2. The powders are pressed in pressing moulds of 4.2 mm diameter and 4.1 mm length around a centrally arranged tantalum wire at press density of 2.8 g/cm³. The green bodies were sintered in a vacuum of $10^{-8}$ bars. The anode structures are anodised to a forming voltage of 16 V and provided with a $MnO_2$-cathode. The anodes are operated at constant temperature and with an alternating current of the working voltage as presented hereafter. 50 capacitors were run in parallel in each of the following tests:

FIGS. 6a and 6b show the leakage current respectively the capacitance of a capacitor made from the powder of example 1 (comparison) at a temperature of 125° C. and a working voltage of 4 V during 5000 hours of operation.

Figure 7:
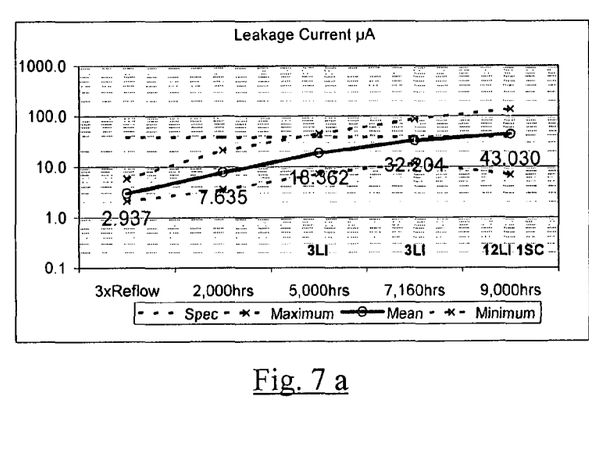
FIGS. 7a and 7b show the leakage current respectively the capacitance of a capacitor made from the powder of example 2 (N-doped) at a temperature of 125° C. and a working voltage of 4 V during 9000 hours of operation.

FIGS. 7a and 7b show the leakage current respectively the capacitance of a capacitor made from the powder of example 2 (N-doped) at a temperature of 125° C. and a working voltage of 4 V during 9000 hours of operation.

Figure 8:
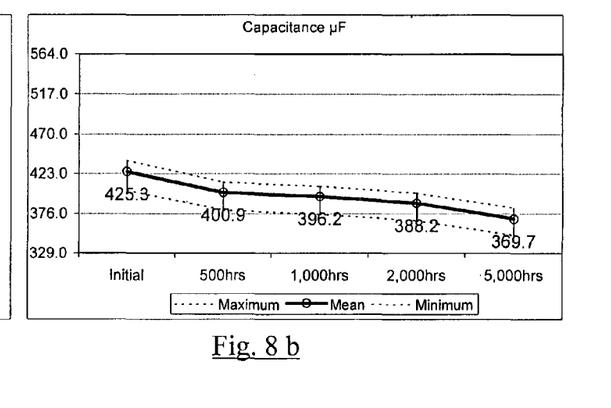
FIGS. 8a and 8b show the leakage current respectively the capacitance of a capacitor made from the powder of example 1 (comparison) at a temperature of 140° C. and a working voltage of 2 V during 5000 hours of operation.

FIGS. 8a and 8b show the leakage current respectively the capacitance of a capacitor made from the powder of example 1 (comparison) at a temperature of 140° C. and a working voltage of 2 V during 5000 hours of operation.

Figure 9:
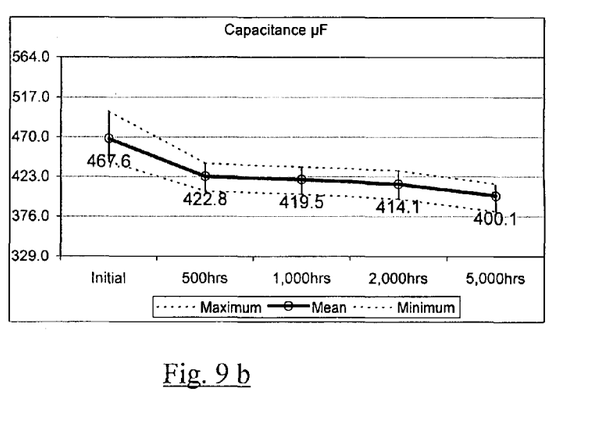
FIGS. 9a and 9b show the leakage current respectively the capacitance of a capacitor made from the powder of example 2 (N-doped) at a temperature of 140° C. and a working voltage of 2 V during 5000 hours of operation.

FIGS. 9a and 9b show the leakage current respectively the capacitance of a capacitor made from the powder of example 2 (N-doped) at a temperature of 140° C. and a working voltage of 2, V during 5000 hours of operation.

The invention claimed is:

1. A niobium suboxide powder comprising niobium suboxide particles having a bulk nitrogen content of between 1,000 to 8,000 ppm, wherein the nitrogen is quasi homogeneously distributed in the bulk of the powder particles and the content of Fe, Cr, Ni, Cu, Na, K, Cl are less than 15 ppm each and wherein the nitrogen at least partly is present in the form of $Nb_2N$ crystals and the $Nb_2N$ crystals have a size sufficiently to give a peak in $Cu_{K\alpha}$-x-ray radiation at 2Θ-angle of about 38.5°.

2. The niobium suboxide powder according to claim 1, wherein the nitrogen content is between 3,000 to 5,000 ppm.

3. The niobium suboxide powder according to claim 1, wherein the height of the $Nb_2N$ peak at about 2Θ=38.5° is between 2 to 25% of the height of the NbO peak at 2Θ=30°.

4. The niobium suboxide powder according to claim 1, wherein the $Cu_{K\alpha 1}$-peak at about 2Θ=38.5° has a half-value width of between 0.05 and 0.2°.

5. The niobium suboxide powder according to claim 1, wherein the powder has a grain size distribution characterized by a D10-value of between 50 and 90 µm, a D50-value of between 150 and 210 µm, and a D90-value of between 250 to 350 µm, as determined according to ASTM B 822.

6. The niobium suboxide powder according to claim 1, wherein the niobium suboxide powder particles are agglomerates of primary particles of mean diameter of 0.1 to 1.5 µm.

7. The niobium suboxide powder according to claim 1, wherein the niobium suboxide powder particles are agglomerates of primary particles of mean diameter of 0.3 to 1.0 µm.

8. The niobium suboxide powder according to claim 1, wherein the niobium suboxide has the composition $NbO_x$ with 0.7<x<1.3.

9. The niobium suboxide powder according to claim 8, wherein 1<x<1.033.

10. The niobium suboxide powder according to claim 1, wherein the oxygen content is between 14.5 to 15.1 wt-%.

11. The niobium suboxide powder according to claim 1, having a burning time of more than 5 min, when 50 g thereof are arranged in an area of 150×30 mm on a niobium sheet of 0.1 mm thickness and ignited at one end.

12. A niobium suboxide powder comprising niobium suboxide particles having a bulk nitrogen content of between 1,000 to 8,000 ppm, wherein the nitrogen is quasi homogeneously distributed in the bulk of the powder particles and the content of Fe, Cr, Ni, Cu, Na, K, Cl are less than 15 ppm each the nitrogen at least partly is present in the form of $Nb_2N$ crystals wherein the height of the $Nb_2N$ peak at about 2Θ=38.5° is between 2 to 25% of the height of the NbO peak at 2Θ=30°.

* * * * *